(12) United States Patent
Gandhi et al.

(10) Patent No.: US 9,607,295 B1
(45) Date of Patent: Mar. 28, 2017

(54) AUTOMATED ENFORCEMENT OF SOFTWARE APPLICATION USAGE LICENSE

(75) Inventors: Ashish Rajkumar Gandhi, Brentwood, CA (US); Abhishek Sumitra Sheth, Pleasanton, CA (US)

(73) Assignee: Cellco Partnership, Basking Ridge, NJ (US)

( * ) Notice: Subject to any disclaimer, the term of this patent is extended or adjusted under 35 U.S.C. 154(b) by 1519 days.

(21) Appl. No.: 13/034,253

(22) Filed: Feb. 24, 2011

(51) Int. Cl.
*G06F 21/00* (2013.01)
*G06Q 20/12* (2012.01)

(52) U.S. Cl.
CPC .............................. *G06Q 20/1235* (2013.01)

(58) Field of Classification Search
CPC .................................................. G06Q 20/1235
USPC .......................................................... 705/59
See application file for complete search history.

(56) References Cited

U.S. PATENT DOCUMENTS

| | | | | |
|---|---|---|---|---|
| 6,510,502 B1* | 1/2003 | Shimizu | ................... | G06F 21/10 711/164 |
| 2010/0251346 A1* | 9/2010 | Dumais | ................... | G06F 21/10 726/5 |
| 2011/0047540 A1* | 2/2011 | Williams | .................. | G06F 8/61 717/178 |

* cited by examiner

*Primary Examiner* — Charles C Agwumezie

(57) ABSTRACT

An application store server may download a license to use a selected software application, after purchase of the license, along with the selected software application. The downloaded software application and license may be stored in the wireless mobile communication device. A user of the wireless mobile communication device may run the downloaded software application. In response, the downloaded software application may send a request for permission to run to an application store client in the wireless mobile communication device. The application store client may not return this permission, unless running is determined to be permitted by the downloaded license. The downloaded software application may in addition or instead seek to determine whether running is permitted by the downloaded license. An application store server may download a license to use a selected software application, after purchase of the license, along with the selected software application. The downloaded software application and license may be stored in the wireless mobile communication device. A user of the wireless mobile communication device may run the downloaded software application. In response, the downloaded software application may send a request for permission to run to an application store client in the wireless mobile communication device. The application store client may not return this permission, unless running is determined to be permitted by the downloaded license. The downloaded software application may in addition or instead seek to determine whether running is permitted by the downloaded license.

22 Claims, 5 Drawing Sheets

AUTOMATED ENFORCEMENT OF SOFTWARE APPLICATION USAGE LICENSE

BACKGROUND

Technical Field

This disclosure relates to software applications which are run on wireless mobile communication devices, including the licenses which authorize their use.

Description of Related Art

A broad variety of software applications may be downloaded, installed, and run on wireless mobile communication devices. These software applications may relate to virtually any user interest or need, such as education, entertainment, finance, health, instant messaging, social networking, maps, navigation, music, news, document generation, photography, shopping, sports, travel, utilities, and/or the weather.

One challenge relating to these downloaded software applications may be to enforce licenses which restrict their use. For example, the vendor of a software application may license its use by one user, but may not want the application to be used by another user without additional compensation. Another example is a license which expires after a time period.

Technologies have been developed which protect such downloaded software applications from uses beyond what have been licensed. However, such technologies may require software application developers to maintain servers which provide authorization keys. Such technologies may also require a license agent to be run in the wireless mobile communication device which is device dependent, requiring a different license agent to be written for each different wireless mobile communication device platform.

SUMMARY

An application store server may include a database of software applications, an application selection system which allows a user to select one of the software applications for downloading and use, an application payment system which allows the user to purchase a license to use the selected software application, and a download system which downloads the license, after the purchase of the license, along with the selected software application. The license may include information indicative of one or more restrictions on the use of the selected software application by the user, the identity of the user, and the identity of the selected software application.

The application store server may include a license signing system which signs the license in a manner that facilitates the authentication of the license. The download system may download the signed version of the license.

The application payment system may allow the user to select and purchase one of a plurality of different licenses to use the selected software application. The download system may download the selected license after the purchase of the selected license, along with the selected software application.

The application selection system, the application payment system, and the download system may function under the direction of an application store client running on the wireless mobile communication device.

The download system may receive a request for the license after downloading the license and again download the license in response to the request.

The downloaded software application may be configured to run on a wireless mobile communication device. Each time a request is made to run the software application, the software application may read the license to use the software application from a file in the wireless mobile communication device which is separate from the software application. The software application may determine whether running of the software application in the wireless mobile communication device is permitted by the read license. The software application may not run if running is determined not to be permitted by the read license.

The determining of whether the software application is permitted to be run in the wireless mobile communication device may include checking to see whether the identity of the user of the wireless mobile communication device matches the identify of the user in the license and/or whether the software application is the one identified in the license.

The software application may determine whether the file containing the license is authentic and may not run if the file is not determined to be authentic.

The software application may send a request for permission to run to an application store client on the wireless mobile communication device and may not run if that permission is not granted.

The application store client may receive the request for permission to run from the requesting software application. In response, the application store client may read the license from the file. The application store client may determine whether running of the requesting software application in the wireless mobile communication device is permitted by the read license. The application store client may send a response to the requesting software application containing information which prevents the requesting software application from running in the wireless mobile communication device if the determination indicates that the requesting software application is not permitted to run in the wireless mobile communication device by the read license.

In response to the request from the requesting software application, the application store client may check to see whether a file containing a license which permits the requesting software application to run in the wireless mobile communication device is present in the wireless mobile communication device. If not, the application store client may communicate with the application store server to determine whether the user has purchased such a license and, if so, to download a copy of the license from the application store server. If the user has not purchased a license which permits the requesting software application to run in the wireless mobile communication device, the application store client may offer an opportunity to the user to purchases such a license in cooperation with the application store server.

If the read license does not permit the requesting software application to run in the wireless mobile communication device, the application store client may communicate with the application store server for the purpose of obtaining another license which will permit the requesting software application to run in the wireless mobile communication device.

The application store client may determine whether the file containing the license is authentic and send a response to the requesting software application containing information which prevents the requesting software application from running in the wireless mobile communication device if the determination indicates that the file is not authentic.

The absence of the application store client from the wireless mobile communication device may cause a notice to be provided to the user advising that the application store client is missing and providing a link where it may be downloaded.

The various license verifications processes which have been describe may function in connection with one or more features in the software application in addition to or instead of verification that the license authorizes the entire software application to run.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
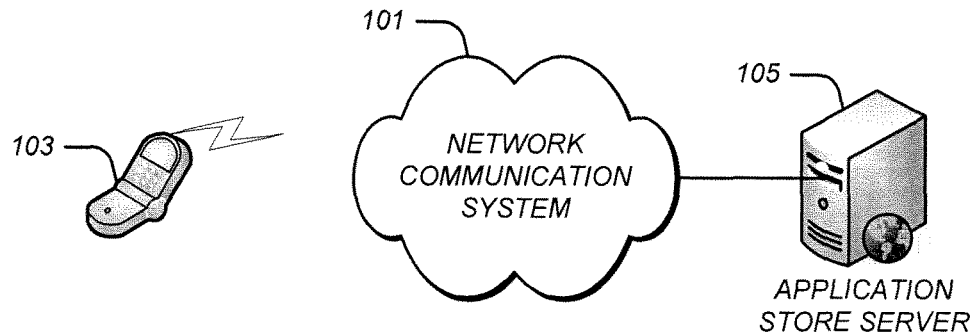
FIG. 1 illustrates an example of a wireless mobile communication device, a network communication system, and an application store server.

FIG. 1 illustrates an example of a wireless mobile communication device, a network communication system, and an application store server. As illustrated in FIG. 1, a network communication system 101 may facilitate communication between a broad variety of devices, including wireless mobile communication devices, such as a wireless mobile communication device 103, and application store servers, such as an application store server 105.

The network communication system 101 may be of any type. For example, the network communication system 101 may include one or more cellular communication systems, the internet, one or more wide area networks, one or more local area networks, or any combination of these. The network communication system 101 may include one or more gateways between different types of sub-systems to facilitate communication between them.

Figure 3:
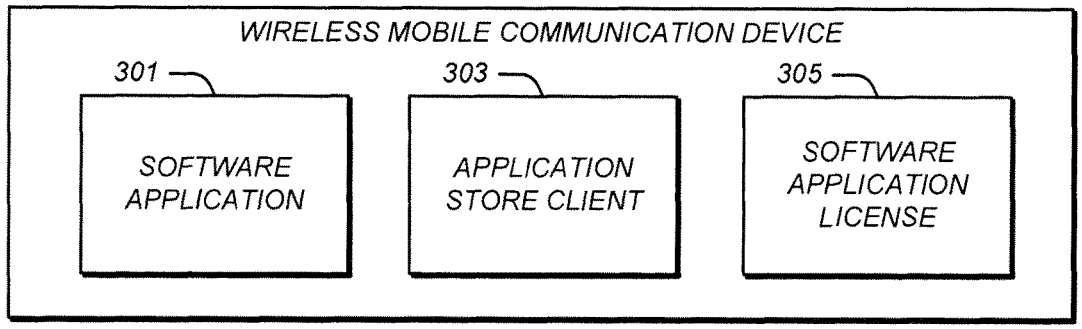
FIG. 3 illustrates an example of the wireless mobile communication device illustrated in FIG. 1.

The wireless mobile communication devices may be of any type. For example, the wireless mobile communication devices may consist of or include a cell phone, a smart phone, a lap top computer, and/or a PDA. An example of a wireless mobile communication device is illustrated in FIG. 3 and discussed below.

The application store servers may be configured to allow users of wireless mobile communication devices to select software applications and to download the selected software applications to the wireless mobile communication devices. These software applications may be installed and run in the wireless mobile communication devices.

Figure 2:
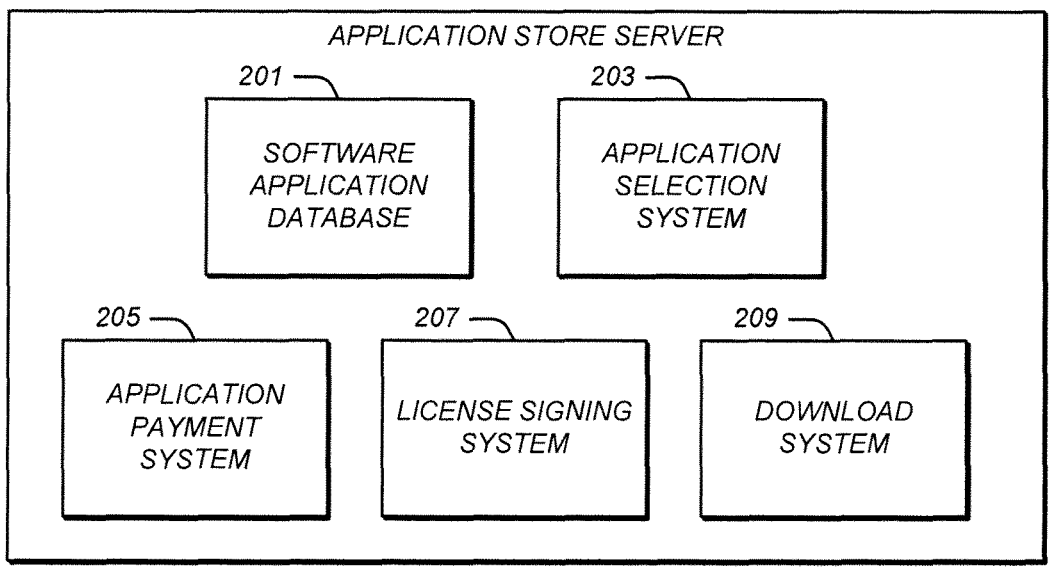
FIG. 2 illustrates an example of the application store server illustrated in FIG. 1.

FIG. 2 illustrates an example of the application store server illustrated n FIG. 1. The application store server illustrated in FIG. 2 may be used in connection with systems which are different from the one illustrated in FIG. 1. Similarly, the application store server 105 may be different from the one illustrated in FIG. 2.

As illustrated in FIG. 2, the application store server 105 may include a software application database 201, an application selection system 203, an application payment system 205, a license signing system 207, and a download system 209.

The software application database 201 may include a database of software applications. Each software application may be configured to be downloaded, installed, and run in a wireless mobile communication device. The software applications may relate to virtually any user interest or need, such as education, entertainment, finance, health, instant messaging, social networking, maps, navigation, music, news, document generation, photography, shopping, sports, travel, utilities, and/or the weather.

The application selection system 203 may be configured to allow a user to select one of the software applications in the software application database 201 for downloading, installation, and use. The application selection system 203 may provide information which may be used in connection with a user interface to facilitate this selection. The application selection system 203 may be configured to receive the user's selection of one of the software applications in the software application database 201 under the control of an application store client running on the wireless mobile communication device.

The application payment system 205 may be configured to allow the user to purchase a license to use the selected software application. The application payment system 205 may be configured to allow the user to purchase this license under the control of an application store client running on the wireless mobile communication device. The application payment system 205 may be configured to provide information which may facilitate this payment through a user interface running in the wireless mobile communication device.

The application payment system 205 may be configured to allow the user to select and purchase one of several different licenses for the selected software application. One license, for example, may allow the selected software application to be used indefinitely, while another license may allow the selected software application to be used only for a limited time. The licenses may also differ in other ways, such as specifying the number of copies of a selected application which may be used in different systems under the control of a single or multiple users, and/or the volume of information which may be processed with the software application, and/or The record of the purchase which is stored at the application store server may be converted into a license string which may include the identify of the user, the identity of the selected software application, the payment terms and expiration and the next time to check (validate) the license on the application store server) and/or renew the license. The license may have payment terms which may indicate if it is for a trial version (time based or feature based), partial version, limited feature enabled version, and/or any additional or different functionality which has been purchased with the software application.

These different selectable licenses may be stored at any location in the application store server. For example, a separate database of licenses may be provided. In other cases, the set of available licenses may be dependent upon the particular software application which is selected. In this case, the set of available licenses may be stored in the software application database 201, along with the software application to which it relates.

The license signing system 207 may be configured to sign the license which the user selects. The signing may be done in a manner that facilitates the authentication of the license. For example, the signing may cause a string which contains the license to be signed using a private key on the application store server. The application store client may have the public key to verify the authenticity of the signature. The software application may also or instead have the public key to permit the signature to be re-verified or verified once it is passed on from the application store client.

The download system 209 may be configured to download the license, after the purchase of the license, along with the selected software application. The license may include information indicative of one or more restrictions on the use of the selected software application by the user, the identity of the user, and the identity of the selected software application. The download system 209 may be configured to download the selected software application and the license to a wireless mobile communication device under the control of an application store client running on the wireless mobile communication device.

FIG. 3 illustrates an example of the wireless mobile communication device illustrated in FIG. 1. The wireless mobile communication device which is illustrated in FIG. 3 may be used in systems which are different than the one illustrated in FIG. 1. Similarly, the wireless mobile communication device illustrated in FIG. 1 may be different than the one illustrated in FIG. 3.

The wireless mobile communication device illustrated in FIG. 3 may include one or more software applications, such as a software application 301, an application store client 303, and one or more software application licenses, such as software application license 305.

The software applications, such as the software application 301, may be software applications which have been downloaded from an application store server, such as the application store server 105, as described above, and installed in the wireless mobile communication device 301. Each software application may be configured to perform one or more of the functions illustrated in FIG. 5, in addition to its primary functions, such as primary functions related to education, entertainment, finance, health, instant messaging, social networking, maps, navigation, music, news, document generation, photography, shopping, sports, travel, utilities, and/or the weather.

The application store client 303 may be configured to communicate with an application store server, such as the application store server 105, for the purpose of allowing a user of the wireless mobile communication device to select, pay for, download, and install one or more software applications from the application store server.

Figure 5:
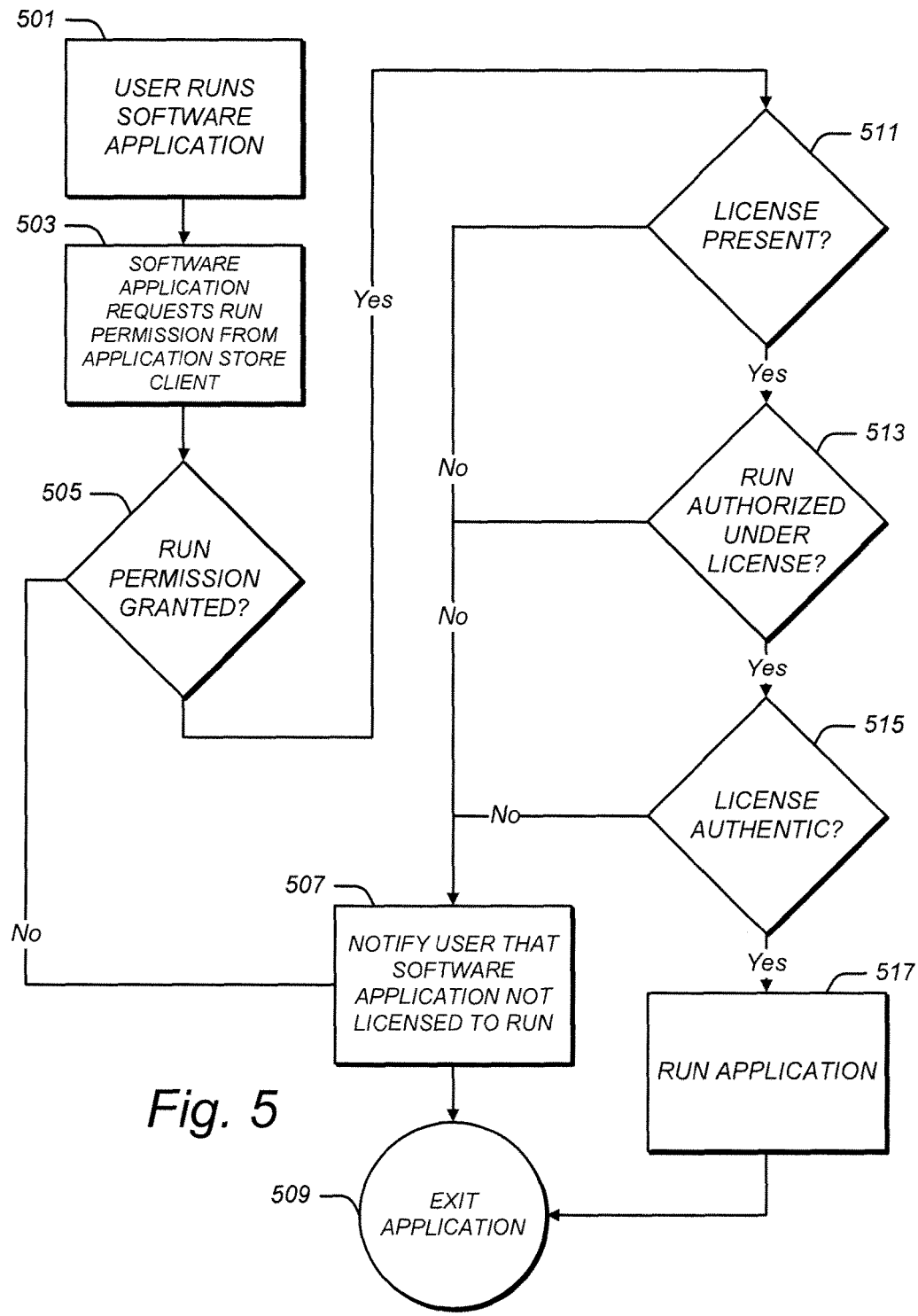
FIG. 5 illustrates an example of a run-time process which the selected software application illustrated in FIG. 3 may implement.

The application store client 303 may be configured to receive requests for permission to run from software applications in the wireless mobile communication device, such as the software application 301. In response, the application store client 303 may be configured to verify that the user has a license to run the requesting software application and, if so, to provide run permission in response. An example of a run-time process which the application store client 303 may be configured to implement is illustrated in FIG. 5 and discussed below.

The wireless mobile communication device may also store one or more software application licenses, such as the software application license 305. Each license may include information indicative of one or more restrictions on the use of a software application by a user, the identity of the user, and the identity of the software application. Each software application license may be signed, thus providing a means for verifying its authenticity.

The wireless mobile communication device may include other systems, such as a wireless mobile communication system configured to facilitate wireless communications with the wireless mobile communication device.

Figure 4:
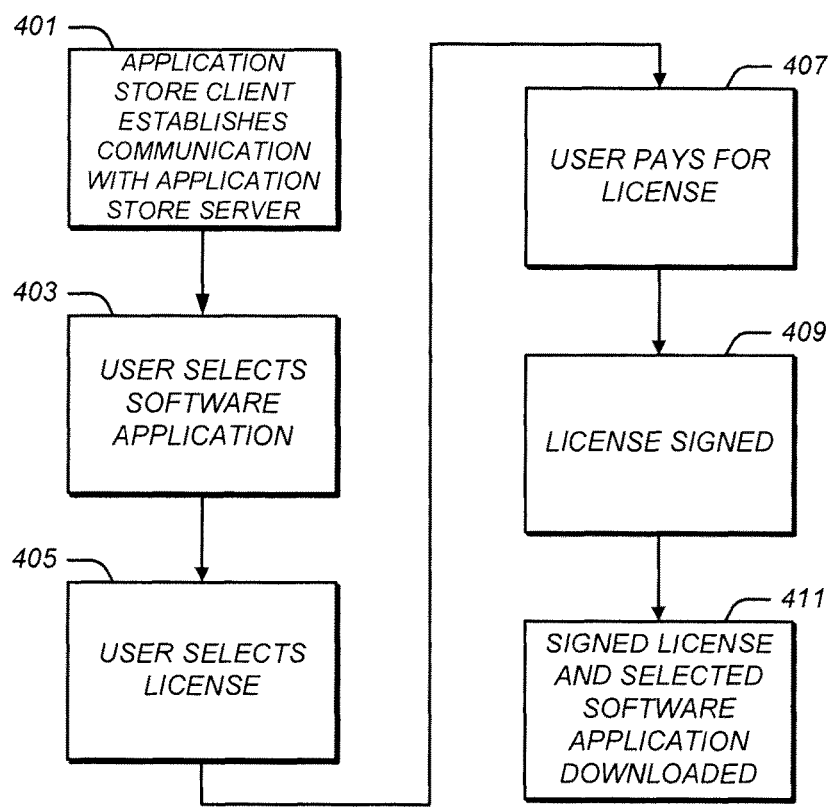
FIG. 4 illustrates an example of a software application selection and purchase process which the application store server illustrated in FIGS. 1 and 2 may implement.

FIG. 4 illustrates an example of a software application selection and purchase process which the application store server illustrated in FIGS. 1 and 2 may implement. The process illustrated in FIG. 4 may be used in connection with a system which is different from the one illustrated in FIG. 1 and/or in connection with an application store server which is different from the one illustrated in FIG. 2. Similarly, the application store server which is illustrated in FIGS. 1 and/or 2 may implement a process which is different from the one illustrated in FIG. 4.

A user of the wireless mobile communication device illustrated in FIG. 3 may wish to locate, download, install, and run a new software application. To facilitate this, the user may run the application store client 303. In turn, the application store client 303 may establish communication with an application store server, such as the application store server 105. This is reflected in an Application Store Client Establishes Communication With Application Store Server step 401.

The application selection system 203 in the application store server 105 may provide information to the application store client 303 which may enable the user to select a particular software application, as reflected by a User Selects Software Application step 403. Any means may be used to facilitate this selection. For example, a user may be permitted to search for a software application by entering the name of the application, words relating to its functionality, and/or any other type of identifying information. A user interface may instead allow a user to browse through a list of software application favorites, a hierarchical category list, and/or any other type of list.

The application payment system 205 in the application store server 105 may ask the user to select one of several different licensing options for the selected software application, as reflected by a User Selects License step 405. During this step, a user interface may present the user with a list of the different types of available licenses for the selected software application, along with their purchase price. The types may include any of the types discussed above in connection with the discussion of FIG. 2. The user may select the license which is of most interest.

In some systems, or in connection with some software applications, only a single license may be available. In these systems, or in connection with these software applications, the User Selects License step 405 may be omitted.

Each selected license may include information indicative of one or more restrictions on the use of the selected software application by the user and the identity of the selected software application. Once selected, information indicative of the identity of the user may be added to the selected license and become a part of the selected license.

The application payment system 205 may ask the user to pay for the selected license or for the only available license, as reflected by a User Pays for License step 407. During this step, a user interface may accept payment for the license or seek permission to bill the user for the license.

The license may be signed by the license signing system 207, as reflected by a License Signed step 409. The signing may be done using the techniques described above in connection with the license signing system 207.

The download system 209 in the application store server 105 may download the selected software application and the signed license to the wireless mobile communication device 303, as reflected by a Signed License and Selected Software Application Downloaded step 411.

The application store client 303 in the wireless mobile communication device may receive and install the downloaded software application. The application store client 303 may also receive and store the signed license in a file on the wireless mobile communication device. The application store client 303 may maintain a table associating each downloaded software application with its associated signed license file.

FIG. 5 illustrates an example of a run-time process which the selected software application illustrated in FIG. 3 may implement. The process illustrated in FIG. 5 may be implemented by a software application different from the software application 301 illustrated in FIG. 3. Similarly, the software application illustrated in FIG. 3 may implement a process which is different from the one illustrated in FIG. 5.

After the selected software application is downloaded and installed, the user may run the software application, as reflected by a Run Software Application step 501. The user may run the software application using any means. For example, the user may select an icon in the wireless mobile communication device which is representative of the software application.

The software application 301 may be configured to perform various preliminary checks, as described below, before actually providing its primary functions in response to the user's request to run the software application. The software application 301 may be configured to perform these preliminary steps by the software application developer of the software application 301. To facilitate this development, a software development kit (SDK) may be provided to the software developer which includes code which the software developer may embed in the software application 301. This code may be configured, upon execution of the software application 301, to link to a special run authorization library routine which performs these various preliminary steps. This run authorization library routine may also be supplied as part of the SDK. This authorization library routine may become part of the software application 301 which is contained in the software application database 201 and which is distributed by the application store server 105. References below to steps implemented by the software application 301 may, in fact, be steps which are implemented by the linked run authorization software library.

Figure 6:
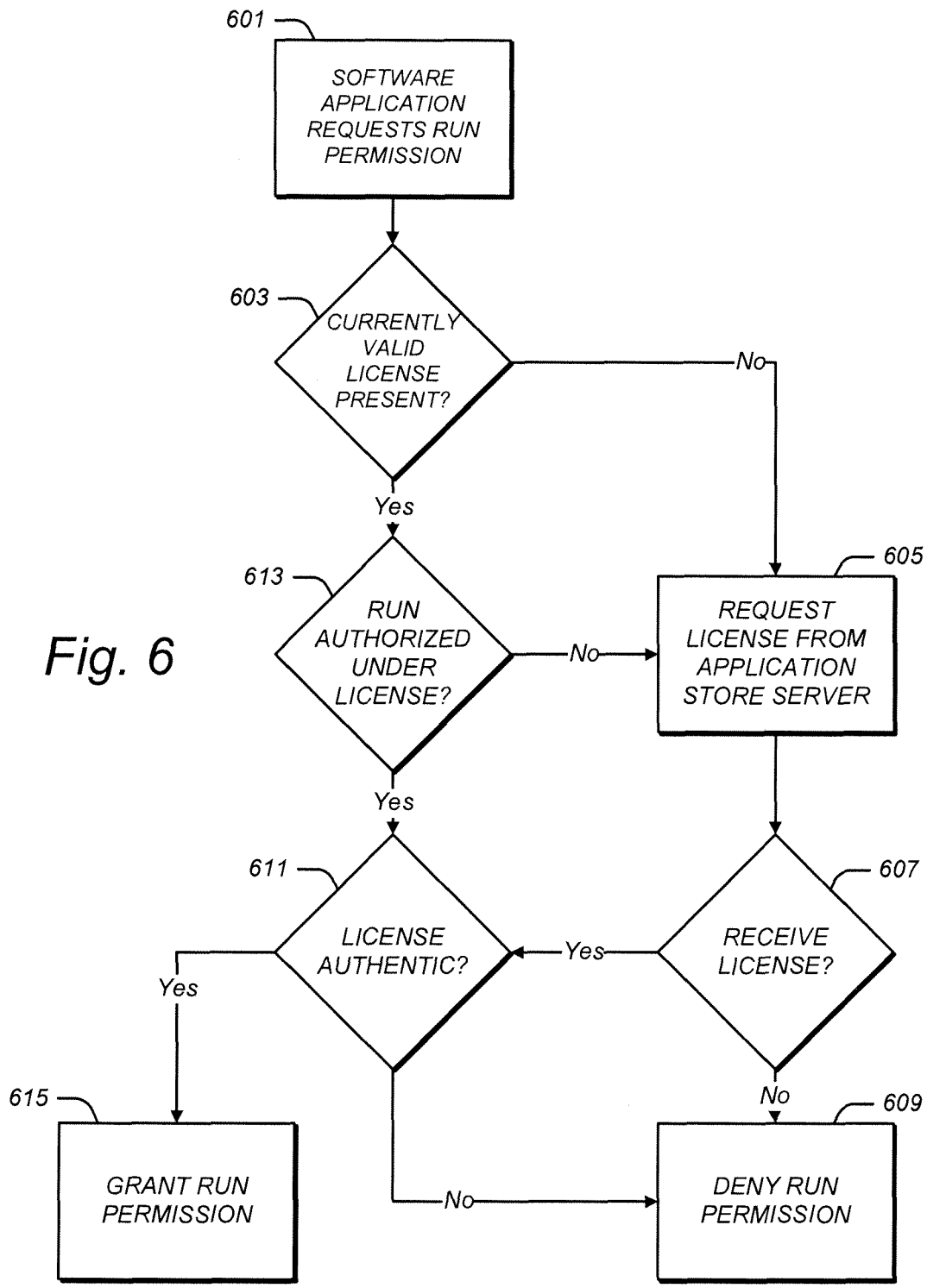
FIG. 6 illustrates an example of a run-time process which the application store client illustrated in FIG. 3 may implement.

Upon initial execution, the software application may request run permission from the application store client 303, as reflected by a Software Application Request Run Permission From Application Store Client step 503. The application store client 303 may perform various steps in determining whether to provide this run permission, examples of which are illustrated in FIG. 6 and discussed below.

The software application 301 may receive a response to the run request from the application store client 303. The software application 301 may determine whether the response grants run permission, as reflected by a Run Permission Granted? decision step 505.

If run permission is denied, the software application 301 may notify the user that the software application is not licensed to run, as reflected by a Notify User That Software Application Not Licensed to Run step 507. This notification may instead or in addition be issued by the application store client 303. The software application may exit without running, as reflected by an Exit Application step 509.

If run permission is granted, on the other hand, the software application 303 may check whether a license to use the software application is stored on the wireless mobile communication device, as reflected by a License Present? decision step 511. If not, the software application 301 may notify the user that the software application is not licensed to run and may exit, as reflected by the Notify User That Software Application Not Licensed to Run step 507 and the Exit Application step 509.

If a license is present, on the other hand, the software application 301 may read the license, including information indicative of one or more restrictions on the use of a software application by a user, the identity of the user, and the identity of the software application. The software application 301 may determine whether it is authorized to run under the read the license, as reflected by a Run Authorized Under License? decision step 513.

During this decision step 513, the software application 301 may compare the identity of the user which is identified in the license with the identity of the user of the wireless mobile communication device. The user in both cases may be identified in any way. For example, the user may be identified by his or her mobile device number (MDN), an email address, and/or any other type of unique information. If the users do not match, the software application 301 may determine that it is not licensed to run and may therefore proceed with steps 507 and 509.

The software application 301 may verify that it is identified as the software application in the license. The identity of the software application may be specified in both places in any way. For example, it may be specified as the name of the software application, which may include its version number and/or the name of the software publisher. The software application 301 may be identified in any other way, such as with a code.

The software application 301 may seek to determine whether running of the software application would be in compliance with the one or more restrictions on the use of the software application which are set forth in the license. For example, the restrictions may specify that the software application may only be used for a certain period of time and/or until a certain date. The software application 301 may seek to determine whether this time period has lapsed and/or this certain date has passed. The software application 301 may check to see whether other restrictions are met. Again, if running of the software application would not be in compliance with the restrictions, the software application 301 may follow the steps 507 and 509.

If the running of the software application is authorized under the license, the software application 301 may seek to determine whether the license is authentic, as reflected by a License Authentic? decision step 515. The software application 301 may follow any procedure to determine whether the license is authentic. For example, if the license has been signed, the software application may first create a cryptographic hash of the license text. It may then decrypt the signature using the public key. Next, the software application may compare the decrypted signature with the generated cryptographic hash. Both should be identical for an authentic license. The determination of authenticity may be made earlier instead.

If the license is determined to be authentic, the software application may run, as reflected by a Run Software Application step 517. Otherwise, the software application 301 may follow the steps 507 and 509.

The software application 301 may not necessarily follow all of the steps which are illustrated in FIG. 5, may not follow the steps in the order illustrated, and/or may follow additional steps. For example, the software application 301 may not follow the steps 503, 505, 511, 513, and/or 515.

FIG. 6 illustrates an example of a run-time process which the application store client illustrated in FIG. 3 may implement. The process illustrated in FIG. 6 may be implemented by an application store client that is different from the application store client 303. Similarly, the application store client 303 may implement a process which is different from the one illustrated in FIG. 6.

The software application client 303 may receive a request for run permission from the software application 301, as reflected by a Software Application Requests Run Permission step 601. In response, the application store client 303 may determine whether a license is present, as reflected by a License Present step 603. The implement details of this step may or may not be the same as the License Present? decision step 511.

Figure 7:
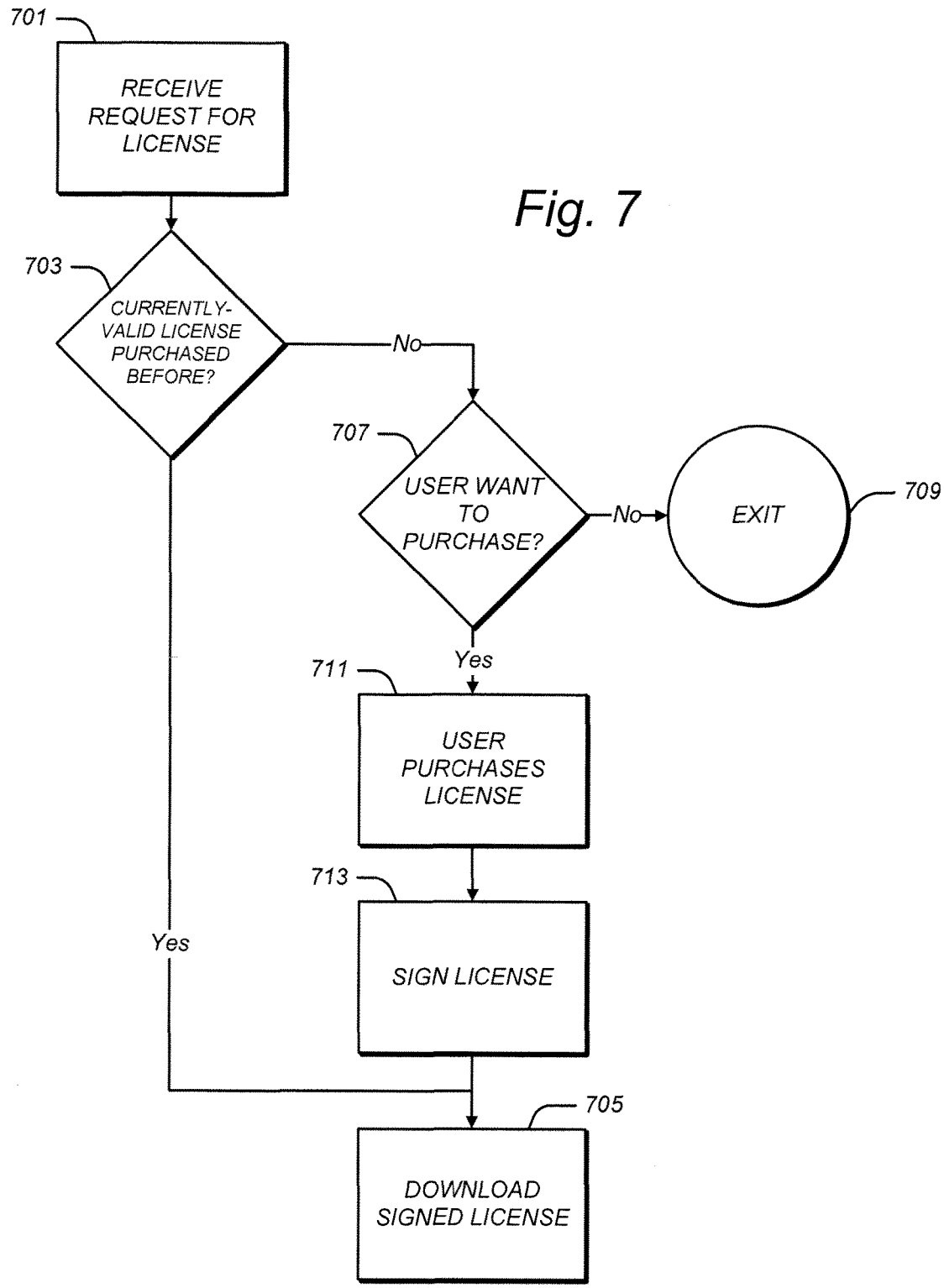
FIG. 7 illustrates an example of a license request-response process which the application store server illustrated in FIGS. 1 and 2 may implement.

If a license is not present, the application store client 303 may request the license from the application store server 105, as reflected by a Request License from Application Store Server step 605. The application server may or may not return a license in response, following a procedure, an example of which is illustrated in FIG. 7 and discussed below. The application store client may determine whether a license is returned in response, as reflected by a Received License? step 607. If no license is received in response, the application store client 303 may send the software application 301 a denial of run permission, as reflected by a Deny Run Permission step 609. If a license is returned in response, on the other hand, the application store client 303 may check to see whether the license is authentic, as reflected by a License Authentic? step 611. This step may or may not be implemented in the same way as the License Authentic? decision step 515 in FIG. 5.

If a license was originally present in the wireless mobile communication device, on the other hand, the application store client 303 may seek to determine whether the software application is authorized to run under the license, as reflected by a Run Authorized Under License? decision step 613. This decision step may or may not be implemented in the same way as the Run Authorized Under License? decision step 513 in FIG. 5.

If running of the software application 301 is not authorized, the application store client 303 may request a license from the application store server, as reflected by the Request License from Application Store Server step 605, and proceed following the response to this step as discussed above.

If the license which is stored on the wireless mobile communication device does authorize the software application 301 to run, the application store client 303 may check to verify that the license is authentic, as reflected by the License Authentic? decision step 611. This step may or may not be implemented in the same way as the License Authentic? decision step 515 in FIG. 5. It may also take place at an earlier time.

If the license is not authentic, the application store client 303 may send a response to the software application 301 denying run permission, as reflected by the Deny Run Permission step 609.

If the license is authentic, on the other hand, the application store client 303 may respond to the software application 301 by granting run permission, as reflected by a Grant Run Permission step 615.

As with the software application 301, the application store client 303 may be configured to perform steps in addition to those which are illustrated in FIG. 6, one or more of the steps in a different order, and/or not all of the steps which are illustrated in FIG. 6. For example, the application store client 303 may not be configured to perform the steps 603, 605, 607, 611, and/or 613.

FIG. 7 illustrates an example of a license request-response process which the application store server illustrated in FIGS. 1 and 2 may implement. The process illustrated in FIG. 7 may be performed by a system which is different from the one illustrated in FIG. 1 or by an application store server which is different from the one illustrated in FIG. 2. Similarly, the system illustrated in FIG. 1 and/or the application store server illustrated in FIG. 2 may implement a process which is different from the one illustrated in FIG. 7.

The application store server 105 may receive a request for a license to a specific software application, as reflected by a Received Request for License step 701. This request may come from the application store client 303, such as during the step 605 illustrated in FIG. 6. This request may include an identification of a specific software application and a specific user using any means of identification, such as any of the means discussed above in connection with decision step 513.

The application store server 105 may seek to determine whether the identified user previously purchased a license to use the identified software application which is currently valid, as reflected by a Currently Valid License Purchased Before? decision step 703. During this step, the application store server 105 may seek to determine whether the identified user had previously purchased a license to the identified software and whether that identified software may currently be run by the identified user under the license. If so, the download system 209 in the application store server 105 may download a signed license version of the license to the application store client 303, as reflected by a Download Signed License step 705.

This particular sequence of the process, namely the steps 701, 703, and 705, may be useful in situations where the user has a license to the software application which is currently valid, but when a copy of that software license is no longer on the wireless mobile communication device which is being used by the user. This can occur, for example, because of a deletion error, a change in the memory of the wireless mobile communication device, and/or because the user is now using a different wireless mobile communication device. This procedure thus makes it easy for a user to change the wireless mobile communication device which is being used, without losing software application usage rights, and without having to manually take any steps to re-obtain these usage rights.

On the other hand, the application store client 303 may determine that the identified user does not own a license to use the identified software which is currently valid during the Currently Valid License? decision step 703. This may occur, for example, because the user never purchased such a license or because the license which the user purchased has expired. In this instance, the application store server 105 may provide information to the application store client 303 which causes a user interface on the wireless mobile communication device to ask the user whether the user wants to purchase a license (or an extension of a purchased license), as reflected by a User Want to Purchase? decision step 707. If the user declines, no license may be downloaded to the application store client 303 and the application store server 105 may simply terminate its communications with the application store client 303, as reflected by an Exit step 709.

If the user does want to purchase a license (or an extension) on the other hand, the application payment system 205 may enable the user to do so, as reflected by a User Purchases License step 711. The implementation details of this step may be the same as the User Pays for License step 407 illustrated in FIG. 4 and discussed above. The purchased license may be signed by the license signing system 207, as reflected by a Sign License step 713. The implementation details of this step may be the same as or different from the License Signed step 409 illustrated in FIG. 4 and discussed above.

The signed license may be downloaded to the application store client 303 by the download system 209, as reflected by the Download Signed License step 705.

Unless otherwise indicated, the application store server illustrated in FIGS. 1 and 2 may be implemented with a computer system configured to perform the functions which have been described herein for the server. The computer system may include one or more computers at the same or different locations. When at different locations, the computers may be configured to communicate with one another through a wired and/or wireless network communication system. Each computer may include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens). Each computer may include software (e.g., one or more operating systems, device drivers, application programs, and/or communication programs), which may be configured when executed to cause the computer to perform one or more of the functions which have been described herein for the computer system. The software may include programming instructions and associated data and libraries. The software may implement one or more algorithms which may cause the computer to perform each function. The software may be stored on one or more tangible storage devices, such as one or more hard disk drives, CDs, DVDs, and/or flash memories. The software may be in source code and/or object code format. Associated data may be stored in any type of volatile and/or non-volatile memory.

Similarly, the wireless mobile communication device which illustrated in FIGS. 1 and 3 may be implemented with a computer system configured to perform the functions which have been described herein for the device. The computer system may include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens). The computer system may include software (e.g., one or more operating systems, device drivers, application programs, and/or communication programs), which may be configured when executed to cause the computer system to perform one or more of the functions which have been described herein. The software may include programming instructions and associated data and libraries. The software may implement one or more algorithms which may cause the computer system to perform each function. The software may be stored on one or more tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, the application store client may be missing from the wireless mobile communication device when the user launches the software application. The wireless mobile communication device may be configured to present the user with an alert informing the user that the application store client is missing. The alert may include a link to where the missing application store client may be downloaded. The user may follow this link to download and install the application store client in the wireless mobile communication device, following which one or more of the verification processes described above, may proceed.

The software application may have specific features which may need to receive authorization to run, in addition or instead of the authorization to run the entire software application. The software application may similarly make a call to the application store client to verify that the user is authorized to run these features under the license. One or more of the processes described above may be used to provide this authorization, in addition to or instead of the authorization to run the entire application. The use of the phrase "software application" in this application is therefore intended to mean one or more features in a software application, as well as the entire software application.

The license may carry other information which may allow the software applications to manage functionalities exposed to the users.

The license string may be used to authenticate the user on an application server at a developers website and create web access for the users.

The license may be used by the application to send a provisioning request to other network elements for provisioning for services which may be bundled with the license.

The failure to validate a license may be used to deactivate a users account on a developer's website or provide information to the developer's website about the end of a subscription.

The event of validating the license may be used by the application to inform the developer's website about the usage pattern for the software application.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

The invention claimed is:

1. An application store server comprising:
a database of software applications;
an application selection system to allow a user to select one of the software applications for downloading and use;
an application payment system to allow the user to purchase a license to use the selected software application; and
a download system to download the license, and download the selected software application separately after the purchase and download of the license,
the downloaded license including information indicative of one or more restrictions on use of the selected software application by the user, an identity of the user, and an identity of the selected software application indicating that the license corresponds to the separate software application being used by the user.

2. The application store server of claim 1 further comprising a license signing system to sign the license in a manner that facilitates authentication of the license, and wherein the download system is configured to download a signed version of the license.

3. The application store server of claim 1 wherein the download system receives a request for the license after downloading the license and downloads the license in response to the request.

4. The application store server of claim 1 wherein:
the application selection system receives the user's selection of one of the software applications under the control of an application store client running on a wireless mobile communication device;
the application payment system allows the user to purchase the license under the control of the application store client; and
the download system downloads the selected software application and the license to the wireless mobile communication device under the control of the application store client.

5. The application store server of claim 1 wherein the application payment system is allows the user to select and purchase one of a plurality of different licenses to use the selected software application.

6. The application store server of claim 1 wherein the one or more restrictions on the use of the selected software application in the license downloaded indicates that fewer than all features of the software application are able to be used.

7. A non-transitory computer-readable storage media including software application computer-readable programming instructions stored thereon causing a wireless mobile communication device, each time a request is made to run the software application on the wireless mobile communication device, to:
read, by an application store client, a license to use the software application from a file stored locally in the wireless mobile communication device, the file and the application store client being separate from the software application, the read license including information indicative of one or more restrictions on use of the software application by a user, an identity of the user, and an identity of the software application;
determine whether running of the software application on the wireless mobile communication device is permitted by the read license; and
prevent the software application from running on the wireless mobile communication device if running of the software application is determined not to be permitted by the read license.

8. The non-transitory computer-readable storage media of claim 7 wherein the determining whether the software application is permitted to be run on the wireless mobile communication device includes checking to see whether the identify of a user of the wireless mobile communication device matches the identify of a user on the license.

9. The non-transitory computer-readable storage media of claim 7 wherein the determining whether the software application is permitted to be run on the wireless mobile communication device includes checking to see whether the software application matches a software application identified in the license.

10. The non-transitory computer-readable storage media of claim 7 wherein the programming instructions include instructions that cause the wireless mobile communication device, each time the request to run the software application on the wireless mobile communication device is made to:
determine whether the file containing the license is authentic; and
prevent the software application from running on the wireless mobile communication device if the license is not determined to be authentic.

11. The non-transitory computer-readable storage media of claim 7 wherein the programming instructions include instructions which cause the wireless mobile communication device, each time the request to run the software application on the wireless mobile communication device is made, to:

send an application request for permission to run the software application to an application store client in the wireless mobile communication device; and prevent the software application form running if, in response to the application request, the application store client does not provide permission for the software application to run on the wireless mobile communication device.

12. A non-transitory computer-readable storage media including software application computer-readable programming instructions stored thereon causing a wireless mobile communication device, each time a request to run the software application on the wireless mobile communication device is made, to:

determine, by an application store client, whether a license stored locally in the wireless device and relating to use of the software application is authentic, the application store client and the license being separate from the software application; and prevent the software application from running on the wireless mobile communication device if the license is not determined to be authentic.

13. The non-transitory computer-readable storage media of claim 12 wherein the software application:

sends a request for permission to run to the application store client in the wireless mobile communication device; and prevents the software application from running on the wireless mobile communication device if the application store client does not provide permission to run in response to the request.

14. The non-transitory computer-readable storage media of claim 13 further comprising programing instructions which cause the wireless mobile communication device to notify the user if the application store client is missing and provide a link to where the user can download and install the application store client.

15. A non-transitory computer-readable storage media including software application computer-readable programming instructions stored thereon causing the wireless mobile communication device, when the application store client is run on the wireless mobile communication device, to:

allow a user of the wireless mobile communication device to select a software application for downloading from a library of software applications on an application store server;

allow the user of the wireless mobile communication device to purchase a license to use the selected software application from the application store server;

download the license, and download the selected software application after the purchase of the license, the license including information indicative of restrictions on use of the selected software application by the user, an identity of the user, and an identity of the selected software application; and store the license in a file locally on the wireless mobile communication device, wherein:

the application store client and the license are separate from the software application, and the application store client determines whether running the software application is permitted by the license.

16. The non-transitory computer-readable storage media of claim 15 wherein the non-transitory computer-readable programming instructions cause the wireless mobile communication device, when the application store client is run on the wireless mobile communication device, to:

receive, from a requesting software application, a request for permission to run the requesting software application on the wireless mobile communication device;

in response to the request:

read the license form the file;

determine whether running of the requesting software application on the wireless mobile communication device is permitted by the read license; and send a response to the requesting software application containing information that prevents the requesting software application from running on the wireless mobile communication device if the determination indicates that the requesting software application is not permitted to run on the wireless mobile communication device.

17. The non-transitory computer-readable storage media of claim 16, wherein, in response to the request from the requesting software application, and if the read license does not permit the requesting software application to run on the wireless mobile communication device, the programming instructions cause the wireless mobile communication device, when the application store client is run on the wireless mobile communication device, to communicate with an application store server to obtain another license which permits the requesting software application to run on the wireless mobile communication device.

18. A non-transitory computer-readable storage media including software application computer-readable programming instructions stored thereon causing a wireless mobile communication device, when an application store client is run on the wireless mobile communication device, to:

receive, from a requesting software application, a request for permission to run the requesting software application on the wireless mobile communication device;

in response to the request:

read a license contained in a file that is stored locally in the wireless mobile communication device and is separate from the application store client and the requesting software application, the read license including information indicative of one or more restrictions on use of a licensed software application by a user, an identity of the user, and an identity of the licensed software application;

determine whether running of the requesting software application on the wireless mobile communication device is permitted by the read license; and send a response to the requesting software application containing information that prevents the requesting software application from running on the wireless mobile communication device if the determination indicates that the requesting software application is not permitted to run on the wireless mobile communication device.

19. The non-transitory computer-readable storage media of claim 18 wherein, in response to the request from the requesting software application, and if the read license does not permit the requesting software application to run on the wireless mobile communication device, the non-transitory computer-readable programming instructions cause the wireless mobile communication device, when the application store client is run on the wireless mobile communication device, to allow the user to communicate with an application store server to purchase another license that permits the requesting software application to run on the wireless mobile communication device.

20. The non-transitory computer-readable storage media of claim 18 wherein, in response to the request from the requesting software application, the non-transitory computer-readable programming instructions cause the wireless mobile communication device, when the application store client is run on the wireless mobile communication device, to:
- if the determination indicates that the requesting software application is not permitted to run on the wireless mobile communication device, communicate with an application store server to determine whether the user has purchased a requesting software application license that permits the requesting software application to run on the wireless mobile communication device and, if so, to download a copy of the requesting software application license from the application store server.

21. The non-transitory computer-readable storage media of claim 20 wherein, when the application store client is run on the wireless mobile communication device and the user has not purchased the requesting software application license, the non-transitory computer-readable programming instructions cause the wireless mobile communication device to offer an opportunity to the user to purchase such the requesting software application license.

22. The non-transitory computer-readable storage media of claim 18 wherein, when the application store client is run on the wireless mobile communication device and in response to the request from the requesting software application, the non-transitory computer-readable programming instructions cause the wireless mobile communication device to:
- determine whether the file containing the license is authentic; and
- send a response to the requesting software application containing information that prevents the requesting software application from running on the wireless mobile communication device if the determination indicates that the file is not authentic.

\* \* \* \* \*